US007313824B1

(12) United States Patent
Bala et al.

(10) Patent No.: US 7,313,824 B1
(45) Date of Patent: Dec. 25, 2007

(54) METHOD FOR PROTECTING DIGITAL CONTENT FROM UNAUTHORIZED USE BY AUTOMATICALLY AND DYNAMICALLY INTEGRATING A CONTENT-PROTECTION AGENT

(75) Inventors: Vasanth Bala, Tarrytown, NY (US); Michael D. Smith, Lexington, MA (US)

(73) Assignee: Liquid Machines, Inc., Waltham, MA (US)

( * ) Notice: Subject to any disclaimer, the term of this patent is extended or adjusted under 35 U.S.C. 154(b) by 888 days.

(21) Appl. No.: 10/194,655

(22) Filed: Jul. 11, 2002

Related U.S. Application Data (60) Provisional application No. 60/305,589, filed on Jul. 13, 2001.

(51) Int. Cl.
 H04L 9/32 (2006.01)
(52) U.S. Cl. .......................................... 726/27; 713/187
(58) Field of Classification Search .................. 726/27; 713/187
 See application file for complete search history.

(56) References Cited

U.S. PATENT DOCUMENTS

| | | | | |
|---|---|---|---|---|
| 5,421,015 A * | 5/1995 | Khoyi et al. ................. | 718/107 |
| 5,485,600 A * | 1/1996 | Joseph et al. .................. | 703/13 |
| 5,539,920 A * | 7/1996 | Menand et al. .............. | 725/151 |
| 5,563,648 A * | 10/1996 | Menand et al. .............. | 725/142 |
| 5,596,718 A | 1/1997 | Boebert et al. | |
| 5,805,800 A * | 9/1998 | Kotani et al. .................. | 726/27 |
| 5,822,435 A | 10/1998 | Boebert et al. | |
| 5,925,100 A * | 7/1999 | Drewry et al. ............... | 709/219 |
| 5,953,534 A * | 9/1999 | Romer et al. ................. | 717/138 |
| 5,960,080 A | 9/1999 | Fahlman et al. | |
| 5,995,969 A * | 11/1999 | Lee et al. .................... | 707/100 |
| 6,006,328 A * | 12/1999 | Drake ......................... | 726/23 |
| 6,138,239 A | 10/2000 | Veil | |
| 6,141,698 A * | 10/2000 | Krishnan et al. ........... | 719/331 |
| 6,158,049 A * | 12/2000 | Goodwin et al. ........... | 717/158 |
| 6,173,283 B1 * | 1/2001 | Kasso et al. ................... | 707/10 |
| 6,247,127 B1 * | 6/2001 | Vandergeest ................. | 713/100 |
| 6,263,491 B1 * | 7/2001 | Hunt .......................... | 717/130 |
| 6,301,660 B1 * | 10/2001 | Benson ........................ | 713/165 |

(Continued)

FOREIGN PATENT DOCUMENTS

EP 0 714 204 A2 11/1995

OTHER PUBLICATIONS

Kessler, P., "Fast Breakpoints: Design and Implementation," *Proceedings of the ACM SIGPLAN'90 Conference on Programming Language Design and Implementation (PLDI)*, pp. 78-84, White Plains, New York, Jun. 20-22, 1990, pp. 78-84.

(Continued)

*Primary Examiner*—Nasser Moazzami
*Assistant Examiner*—David Garcia Cervetti
(74) *Attorney, Agent, or Firm*—Hamilton, Brook, Smith & Reynolds, PC (57) ABSTRACT

A content processor application is loaded into memory from a master image to form a runtime content processor application image. An integration agent dynamically integrates a protection agent into the loaded runtime content processor application image to form a customized content processor application with extended functionality. Only the runtime content processor application image is extended with the protection agent—the application master image remains unaltered.

75 Claims, 7 Drawing Sheets

U.S. PATENT DOCUMENTS

| | | | |
|---|---|---|---|
| 6,317,868 B1 * | 11/2001 | Grimm et al. | 717/127 |
| 6,330,691 B1 * | 12/2001 | Buzbee et al. | 714/35 |
| 6,381,735 B1 * | 4/2002 | Hunt | 717/158 |
| 6,389,402 B1 * | 5/2002 | Ginter et al. | 705/51 |
| 6,405,316 B1 * | 6/2002 | Krishnan et al. | 713/190 |
| 6,427,140 B1 * | 7/2002 | Ginter et al. | 705/80 |
| 6,430,561 B1 * | 8/2002 | Austel et al. | 707/9 |
| 6,456,725 B1 * | 9/2002 | Cox et al. | 381/100 |
| 6,487,646 B1 * | 11/2002 | Adams et al. | 711/163 |
| 6,499,137 B1 * | 12/2002 | Hunt | 717/164 |
| 6,519,700 B1 * | 2/2003 | Ram et al. | 713/193 |
| 6,532,451 B1 * | 3/2003 | Schell et al. | 705/54 |
| 6,615,350 B1 | 9/2003 | Schell et al. | |
| 6,629,123 B1 * | 9/2003 | Hunt | 718/106 |
| 6,658,658 B1 * | 12/2003 | Jones et al. | 717/162 |
| 6,668,325 B1 * | 12/2003 | Collberg et al. | 713/194 |
| 6,681,212 B1 * | 1/2004 | Zeng | 705/51 |
| 6,681,331 B1 | 1/2004 | Munson et al. | |
| 6,711,687 B1 * | 3/2004 | Sekiguchi | 726/23 |
| 6,775,655 B1 * | 8/2004 | Peinado et al. | 705/59 |
| 6,779,154 B1 * | 8/2004 | Nussbaum et al. | 715/523 |
| 6,779,187 B1 * | 8/2004 | Hammond | 719/331 |
| 6,801,999 B1 * | 10/2004 | Venkatesan et al. | 713/167 |
| 6,802,006 B1 * | 10/2004 | Bodrov | 713/187 |
| 6,874,139 B2 * | 3/2005 | Krueger et al. | 717/127 |
| 6,885,748 B1 * | 4/2005 | Wang | 380/201 |
| 6,895,444 B1 * | 5/2005 | Weisshaar et al. | 709/250 |
| 6,918,126 B1 * | 7/2005 | Blais | 719/332 |
| 6,920,567 B1 * | 7/2005 | Doherty et al. | 726/22 |
| 6,952,800 B1 * | 10/2005 | Danner et al. | 715/513 |
| 6,957,422 B2 * | 10/2005 | Hunt | 717/130 |
| 6,965,996 B2 * | 11/2005 | Hirano et al. | 713/176 |
| 6,976,249 B1 * | 12/2005 | Stattenfield | 717/149 |
| 6,988,271 B2 * | 1/2006 | Hunt | 719/315 |
| 7,099,849 B1 * | 8/2006 | Reeder et al. | 705/59 |
| 7,120,763 B1 * | 10/2006 | Schafer | 711/152 |
| 7,155,743 B2 * | 12/2006 | Goodman et al. | 726/25 |
| 2001/0004736 A1 | 6/2001 | Hirano et al. | |
| 2001/0010046 A1 * | 7/2001 | Muyres et al. | 705/52 |
| 2002/0016918 A1 * | 2/2002 | Tucker et al. | 713/190 |
| 2002/0049603 A1 * | 4/2002 | Mehra et al. | 705/1 |
| 2002/0065849 A1 * | 5/2002 | Ferguson et al. | 707/513 |
| 2002/0069399 A1 * | 6/2002 | Miloushey et al. | 717/108 |
| 2002/0083318 A1 * | 6/2002 | Larose | 713/164 |
| 2002/0120924 A1 * | 8/2002 | Miloushev et al. | 717/165 |
| 2002/0129054 A1 * | 9/2002 | Ferguson et al. | 707/503 |
| 2002/0141582 A1 | 10/2002 | Kocher et al. | |
| 2002/0141584 A1 * | 10/2002 | Razdan et al. | 380/203 |
| 2002/0161996 A1 * | 10/2002 | Koved et al. | 713/150 |
| 2002/0178244 A1 * | 11/2002 | Brittenham et al. | 709/223 |
| 2002/0178254 A1 * | 11/2002 | Brittenham et al. | 709/224 |
| 2003/0056205 A1 * | 3/2003 | Miloushev et al. | 717/162 |
| 2003/0061566 A1 * | 3/2003 | Rubstein et al. | 715/500.1 |
| 2003/0135850 A1 * | 7/2003 | Miloushev et al. | 717/165 |
| 2004/0044779 A1 * | 3/2004 | Lambert | 709/229 |
| 2004/0205690 A1 * | 10/2004 | Pieper | 717/100 |
| 2004/0205720 A1 * | 10/2004 | Hundt | 717/124 |

OTHER PUBLICATIONS

Hunt, G. and D. Brubacher, "Detours: Binary Interception of Win32 Functions", *Proceedings of the 1999 Usenix Windows NT Symposium*, USENIX Association, 1999 (9 pp.).

* cited by examiner

METHOD FOR PROTECTING DIGITAL CONTENT FROM UNAUTHORIZED USE BY AUTOMATICALLY AND DYNAMICALLY INTEGRATING A CONTENT-PROTECTION AGENT

RELATED APPLICATION(S)

This application claims the benefit of U.S. Provisional Application No. 60/305,589, filed Jul. 13, 2001. The entire teachings of the above application are incorporated herein by reference.

BACKGROUND OF THE INVENTION

As more and more digital content is transacted electronically, there is an increasing demand for technologies that can secure the content from unauthorized use and distribution. Unlike physical goods, digital content is easily copied and distributed. The only way to prevent this is for the content provider to establish a trusted environment on the end user's machine that can act as a proxy for securing the content from illegal copying and distribution after it is shipped to an authorized end user.

Cryptographic solutions such as Pretty Good Privacy (PGP) (available from Network Associates) and products available from RSA Security, Inc., secure digital content during its transmission through an untrusted channel, but are inadequate for securing it once it gets to the end user's machine. In fact, the science of cryptography matured during World War II as a means for protecting an untrusted communication channel between two parties that trust each other.

In the present case however, the content provider would generally prefer to not have to trust the end user receiving the content, and so the security of the content must continue to persist even after the digital content has been received by the end user. Furthermore, end users who receive digital content would generally prefer to not be burdened with the security concerns of the content provider simply because they received the digital content. This "last mile" problem cannot be addressed by cryptographic techniques alone, because they require the encrypted document to be converted to clear-text on disk before it can be viewed or manipulated by an application on the end user's machine.

One way to establish a trusted end point on the end user's machine is to force the end user to use a trusted piece of software, namely the content player application, to "play" or process the content. The trusted content player application should be capable of directly processing the digital content in the encrypted format in which it is shipped, so that a decrypted or "clear text" form of the original content is never created on disk.

Another solution is to create a security plugin module that can extend the content player application with the desired security features.

SUMMARY OF THE INVENTION

What makes the "last mile" difficult to solve in the real world is the fact that most content publishers do not control the source code for the content player applications that process their content. For example, music publishers create audio content in formats such as MP3 (MPeg-1 Audio Layer 3 digital audio encoding and lossy compression format), Real Audio and Windows Media, but the applications that play audio files in these formats are manufactured by software publishers, and not the music publishers.

Companies that offer digital content security or digital rights management solutions have to seek the cooperation of the software publishers before they can sell their solutions to the content publishers. They have to partner with the software publisher to do source-level integration of their security solution into the software application that will play the content, in order to create a trusted endpoint on the end user's machine for the content publisher. This makes market penetration for such approaches very difficult.

Even if the cooperation of software publishers can be successfully obtained, it is still up to the end user to upgrade any existing version of the software application to the custom version that has the content protector embedded in it. This creates an additional barrier to deployment, especially if the end user has to pay for the upgrade.

An example of such a situation recently appeared in connection with the encryption of PDF (portable document format) files using a digital rights management (DRM) solution. Adobe Systems Incorporated is a software company that manufactures a line of software applications, called Acrobat, based on the PDF file format. It distributes both a limited-functionality Acrobat Reader, which is free, and a full-featured Acrobat product, which costs several hundred dollars to purchase.

Adobe recently announced a partnership with the developer of the DRM solution to integrate that solution into Adobe's line of Acrobat applications. However, Adobe chose to integrate the DRM solution only with its full-featured product and not with the free reader.

From the perspective of a content publisher interested in secure distribution of PDF files, it would prefer to see the DRM solution integrated into both the free reader as well as the full-featured Acrobat application. This is because the high cost of the full-featured product creates a significant market barrier for the content publisher: an end-user receiving a secure PDF file would have to have the expensive full-feature Acrobat product and not just the free reader.

The impact of this price differential can be clearly seen by comparing the installed base of the full-featured version against that of the free reader; the installed base of the full-featured version is tiny compared to that of the free reader. This highlights the fact that for a digital content security solution to be easily deployable in the market, it should be able to work with existing and legacy software applications that can process the original content format.

Some software manufacturers, such as Microsoft Corporation, have taken the initiative of integrating their own security solutions into the content players that they manufacture. They can then provide security services to the content publishers, instead of third-parties such as RSA that are not themselves player software manufacturers.

Even this strategy has problems that concern content publishers. Consider the digital music market for example. The major music publishers are wary of using a proprietary security solution from one manufacturer of a software music player, because it gives that software manufacturer an unfair advantage in the market and locks the music publishers into that one software manufacturer. Furthermore, the problem of upgrading existing and legacy software players still remains.

In an enterprise setting, the problem of legacy software is especially acute. Enterprises typically upgrade software packages long after the upgrades are released, because of the potential disruption such upgrades can cause to the business. For example, many enterprises were still using Microsoft Office 97 in the year 2001, while in this same year, Microsoft prepared to launch its third major release of the Office Suite since releasing Office 97. Though the newest Office Suite may have built-in features for creating and handling encrypted Office files directly, the older versions of the Office Suite still installed in some parts of the enterprise will not be able to interpret these encrypted files. In situations where a secure document needs to be exchanged across enterprise boundaries, this can be particularly vexing.

With respect to plugin strategies, one problem is that they rely on the application to provide a plugin interface that is appropriate for such a solution. Many important applications do not provide such interfaces. For example, there is often a need for securing CAD (computer assisted/aided drafting) files that contain proprietary product details, but existing CAD packages that are widely deployed do not provide a plugin interface that allows the implementation of a security solution.

A further problem with the plugin solution is that it is application-specific. Thus, in the case of MP3 audio format, where there are numerous players installed in the field, a separate plugin module would have to be developed for each player. When the end user upgrades a player, he is responsible for upgrading the plugin as well, assuming an upgraded plugin is readily available at that time.

U.S. Pat. No. 6,317,868, "Process for transparently enforcing protection domains and access control as well as auditing operations in software components" by Grimm, et al., describes another technique for enforcing content protection transparently without requiring the cooperation of the content processing application vendor. Grimm is aimed at enforcing controls on the applications themselves, rather than the content files they process. Although it might be possible to extend Grimm to protect content files as well, Grimm does not address the difficulties of actual deployment on a commercial scale.

For example, Grimm appears to require that the disk image of the content processing application be modified prior to its execution. Thus, Grimm employs a "static integration" scheme, where protection functionality is integrated with an application prior to execution time.

In contrast, the present invention is a dynamic integration scheme, with the integration being repeated every time execution begins. The static integration scheme suffers from some several limitations.

For example, it is generally impossible to determine all of an application's dependencies (i.e., the required dynamic link libraries (DLLs), other data structures it uses at runtime, etc.) from a static analysis of the application binary. For instance, many Win32 applications use "LoadLibrary" to dynamically load certain libraries at execution time, making it very difficult to statically enforce any protection policy on such code.

In addition, many commercial applications invoke operating system DLLs that are not part of the application itself, but nonetheless provide access to many system objects such as the file system. Modifying the disk image of system DLLs can be catastrophic to the robustness of the entire operating system.

Furthermore, the DLLs of some commercial applications have a built-in "checksum" mechanism to detect tampering of their disk image. The tool chain that creates the DLL binary at the application vendor's site embeds a checksum value in the DLL header. This checksum is computed using an algorithm implemented by the operating system. For example, Win32 operating systems provide a "CheckSum-MappedFile" system call that can produce the checksum number for a given DLL or EXE (executable) file, which may be embedded into the header area of the DLL or EXE file. Thereafter, when the Win32 loader loads that DLL into memory on the end user's system, it will compute the checksum itself and compare the result with the checksum embedded in the header. If these two numbers do not match, the loader returns a failure and the application aborts. Because the checksum depends on the bytes that make up the disk image of the original DLL as shipped by the content processing application vendor, any modification of this disk image could cause a checksum comparison failure during loading.

By dynamically performing the integration, the present invention only modifies the already loaded memory image of the DLL, and never its disk image, thus avoiding the above problems.

In addition, static modification of applications can create serious adoption barriers for content publishers interested in distributing protected content files to machines that are outside their jurisdiction. For example, a department within enterprise A wishing to send a protected PDF file to a department within enterprise B cannot require enterprise B to modify all installed copies of their Acrobat PDF reader application in order to view the protected PDF file.

U.S. Pat. No. 5,953,534, entitled "Environment manipulation for executing modified executable and dynamically-loaded library files," to Romer, et al., describes a technique used to statically transform an application DLL or EXE file, such that the transformed version behaves the same as the original, but allows features like instrumentation, security, auditing, etc., to be implemented transparently. This scheme suffers from the same problems as Grimm regarding static integration. Manipulation of import tables is performed statically. This implies that the import table entries have not yet been initialized by the operating system linker, so that the import table can be replaced in its entirety if so desired.

The present invention, on the other hand, only patches the loaded memory image of the import table after the linker has initialized the import table's entries with target addresses. Furthermore, only the relevant entries that pertain to file I/O (input/output) related calls need to be patched.

A final problem with static integration of a security policy with the content processor application is that it binds a single policy with the application. Thus, if two different content publishers A and B want to associate two different content protection modules with their respective documents, two different versions of the content processor application will have to be created on the end user's machine. By using dynamic integration, the present invention allows the same content processor application to be used for both.

In summary, the present invention allows any digital content protection solution to be deployed easily, without disrupting an existing installed base of legacy applications, or preventing upgrades or replacement of these applications. It effectively disassociates the content protection enforcement from the content processor application, thereby empowering content publishers to use any content protection method of their choice, without tying it to a specific content processor application. It is also content processor application "agnostic," allowing a single solution to work across a variety of applications that may all be capable of processing the same content format type. The invention also does not rely on the existence of a plugin interface in the application, allowing it to work even with future upgrades of the current application.

Accordingly, the invention method for extending a content processor application includes loading the content processor application into memory from a master image to form a runtime content processor application image, and dynamically integrating a protection agent into the loaded runtime content processor application image to form a customized content processor application with extended functionality. Only the runtime content processor application image is extended with the protection agent—the application master image remains unaltered.

The protection agent may comprise an amalgamator and one or more content protection modules. The protection agent is integrated into the runtime content processor application image by first injecting the amalgamator into the runtime content processor application image. The amalgamator then loads the content protection modules, and integrates the modules with the runtime content processor application image to provide the extended functionality. Such extended functionality may include, for example, accessing protected content.

The protection agent preferably executes within the same address space as the customized content processor application, and is thus easily able to support editing of protected content without the loss of protection, for example by intercepting I/O function calls, memory storage calls, cut/paste calls, etc.

Some content protection modules may be used to access protected content.

Content protection modules may be produced by a third-party. Plural content protection modules may be simultaneously registered with the protection agent, and may correspond to different content formats. They may be used in parallel by the customized content processor application to process different documents, or to process different portions of a single document. Content protection modules may be used to prevent the export, in an unprotected form, of at least a portion of the protected content, for example, by causing all I/O operations that target unprotected files/memory buffers to write out data in a protected format. Furthermore, content protection modules may be used to maintain an audit trail.

The customized content processor may process both protected and unprotected content. The extended functionality may include, for example, content protection, rights management, and encryption/decryption.

Preferably, the protection agent is independent of the content processor application. That is, they may be independently developed, each with no prior knowledge of the other. Similarly, the protection agent may be independent of any plugin interface provided by the content processor application.

The content processor application may be an existing/legacy application.

The dynamic integration of the protection agent with the content processor application may be performed either in hardware, software, or a combination.

In one embodiment, the operating system boot process is modified so that upon attempting to launch an application that serves as an interactive shell, such as Microsoft's Windows Explorer, which can be used to launch other applications, instead an integration agent application is launched. The integration agent then launches the intended application (e.g., Microsoft's Windows Explorer) and dynamically integrates it with the protection agent.

In another embodiment, an end user may explicitly enable the automatic and dynamic integration of the protection agent into all subsequently launched content processor applications.

The dynamic integration of the protection agent into the loaded application runtime memory image may be performed by an integration agent, which may be a standalone software application. In one embodiment, the integration agent may be associated with a file type corresponding to at least one protected content document.

Integration of the protection agent into the runtime content processor application image may include identifying file I/O related operating system calls that can be made by the application, and then overwriting the identified file I/O related operating system calls to point to corresponding functions which extend the functionality of the content processor application. For example, file I/O related operating system calls may be identified by examining an import table associated with the runtime content processor application image. These system calls may then be intercepted by overwriting corresponding identified entries in the import table. Alternatively, calls to functions that load additional executable code, such as a dynamically linked library (DLL) module, into memory may be identified and overwritten to point to corresponding functions contained within the protection agent.

In one embodiment, the steps of loading the application and integrating the protection agent into the runtime content processor application image are performed automatically and transparently (that is, without the knowledge or active participation of the end user) when the application is selected for execution.

The integration agent may be registered in place of the content processor application, so that the integration agent is executed when the application is selected. The integration agent then proceeds to integrate the protection agent with (i.e., inject the protection agent into) the runtime content processor application image.

A system for extending a content processor application according to an embodiment of the present invention, includes a loader, an integration agent and a protection agent. The loader loads the content processor application into memory from a master image to form a runtime content processor application image. The integration agent dynamically integrates a protection agent into the loaded runtime content processor application image to form a customized content processor application with extended functionality, only the runtime content processor application image being extended with the protection agent, leaving the application master image unaltered. The protection agent provides access to protected content.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

As used herein, a "content protection module" (or protection module, for short) is a software module which provides clear-text access to cipher-text content for only authorized users. Further, a "content processor application" (or content processor) is any software application that supports the viewing and/or editing of clear-text content files. Also, a "protected content" is an encrypted cipher-text file (possibly containing additional information required for authentication), which the content protection module knows how to decrypt and interpret.

The content protection module may also be implemented using a combination of software and hardware. In any case, the software component, possibly backed by hardware support, must include the "main" or "driver" portion because it is integrated into the software of the content processor application and gets control before the content processor application.

Figure 1A:
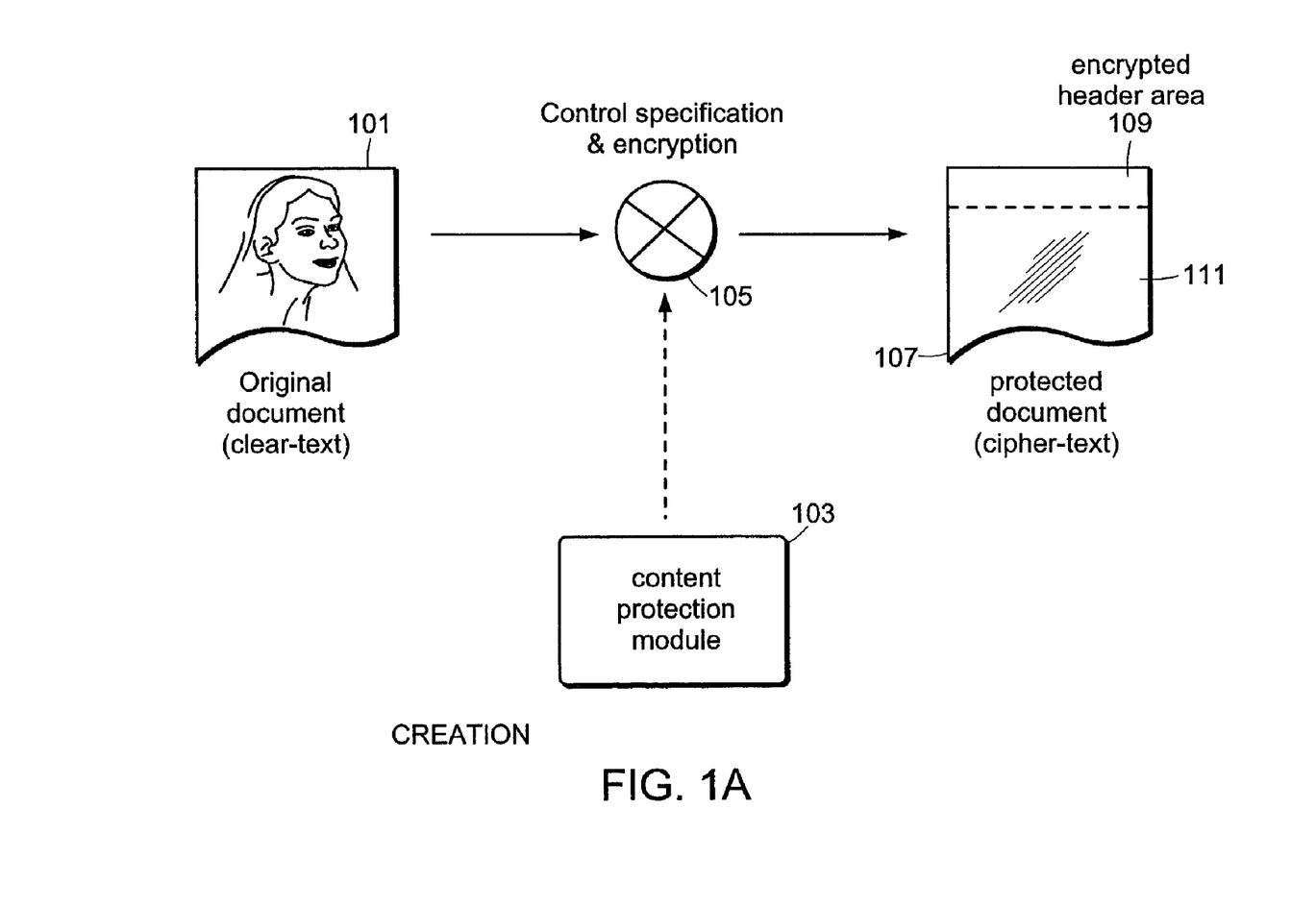
FIG. 1A is a high-level block diagram that illustrates the creation of a protected document containing protected content.

FIG. 1A is a high-level block diagram that illustrates the creation of a protected document. The original (clear-text) document 101 is encrypted at 105 by the content protection module 103, to form a protected document (cipher-text) 107. In one embodiment, the protected document 107 comprises an encrypted header area 109 and the protected content 111.

Figure 1B:
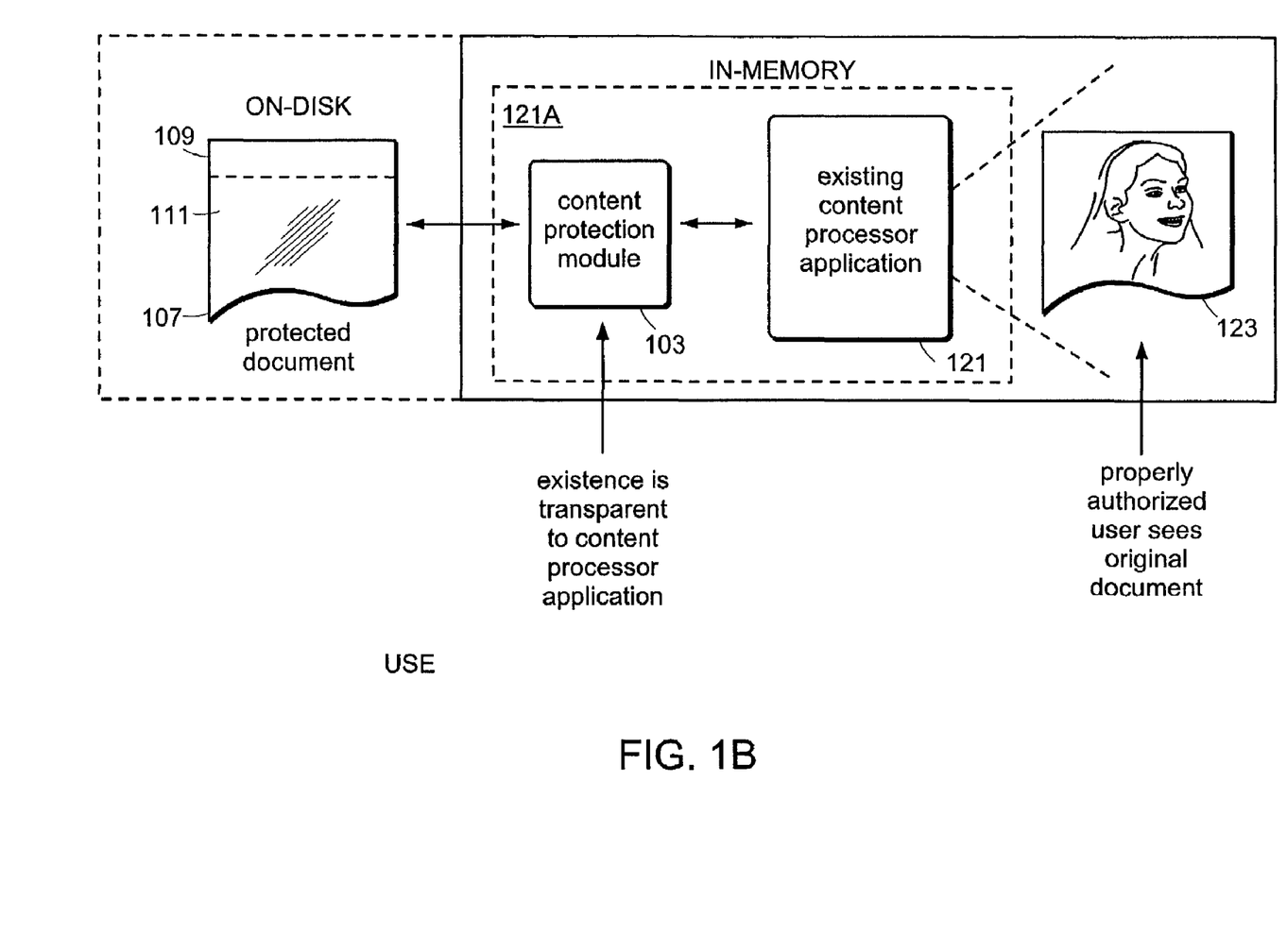
FIG. 1B is a high-level block diagram illustrating the use or access of the protected content with an embodiment of the present invention.

FIG. 1B is a high-level block diagram illustrating the use or access of the protected document 107 and hence protected content 111 with an embodiment of the present invention. To view or edit the protected document 111, the content processor application 121 must be integrated with an appropriate content protection module 103 to translate or decrypt the document contents into a clear-text version 123 of the original document 101. The existence of the content protection module 103 is transparent to the content processor application 121.

The present invention does not depend upon the specific content protection algorithm used by the content protection module 103 (e.g., for encryption or authentication); any desired method may be integrated with a new or legacy content processor application 121 without requiring any access to source code of the content processor application, or any cooperation from the vendor of that application. The focus is instead on the integration of a protection scheme with the content processor application 121, and not on the particular technology used for content protection (encryption, authentication, etc.).

An embodiment of the present invention consists of an "integration agent", which may be a stand-alone application, and an "amalgamator" module that automatically integrates one or more content protection modules 103 with any existing or legacy content processor application 121 that is capable of processing the original clear-text form of the content/document.

Integration is performed dynamically when the content processor application 121 (FIG. 1B) is launched, and is performed only on the image of the content processor application loaded into memory. The content processor application 121 itself is never modified on disk, and no source-level integration or plugin interface is required. Applicants thus refer to the memory image of the content processor application modified by such a process as a "dynamically customized content processor", or more simply, a "customized content processor" 121A. Thus, a content protection module 103 may be automatically and dynamically integrated with any existing content processor application 121 that is used to process a content file.

For example, if the content processor application 121 is Microsoft Word and the original content file 101 is a Word document, then the present invention enables a Word document to be transferred and stored as a protected cipher-text document 107 (which need not be in a format that is compatible with the Microsoft Word application), while an existing Microsoft Word application 121 can process it as if it were a regular clear-text Word file.

When the Microsoft Word application 121 is launched, the dynamic integration process of the present invention automatically integrates an appropriate content protection module 103 with the Microsoft Word application 121 in memory. Thereafter, whenever the executing Word application 121 accesses the encrypted Word document 107, the content protection module 103 is invoked automatically and transparently, dynamically authenticating the access rights and decrypting the portion of the protected document that is being accessed.

This dynamic integration occurs only on the memory image of the content processor application 121, not in its disk image. Thus, an installed content processor application 121 is never modified on disk, and the user's experience of working with the document is unchanged, unless some authentication or authorization check fails.

In one embodiment, the integration agent application and the amalgamator module are small enough that they can be shipped with the protected document 107, so that the end user can install them if they are not already installed on the user's computer.

Figure 2:
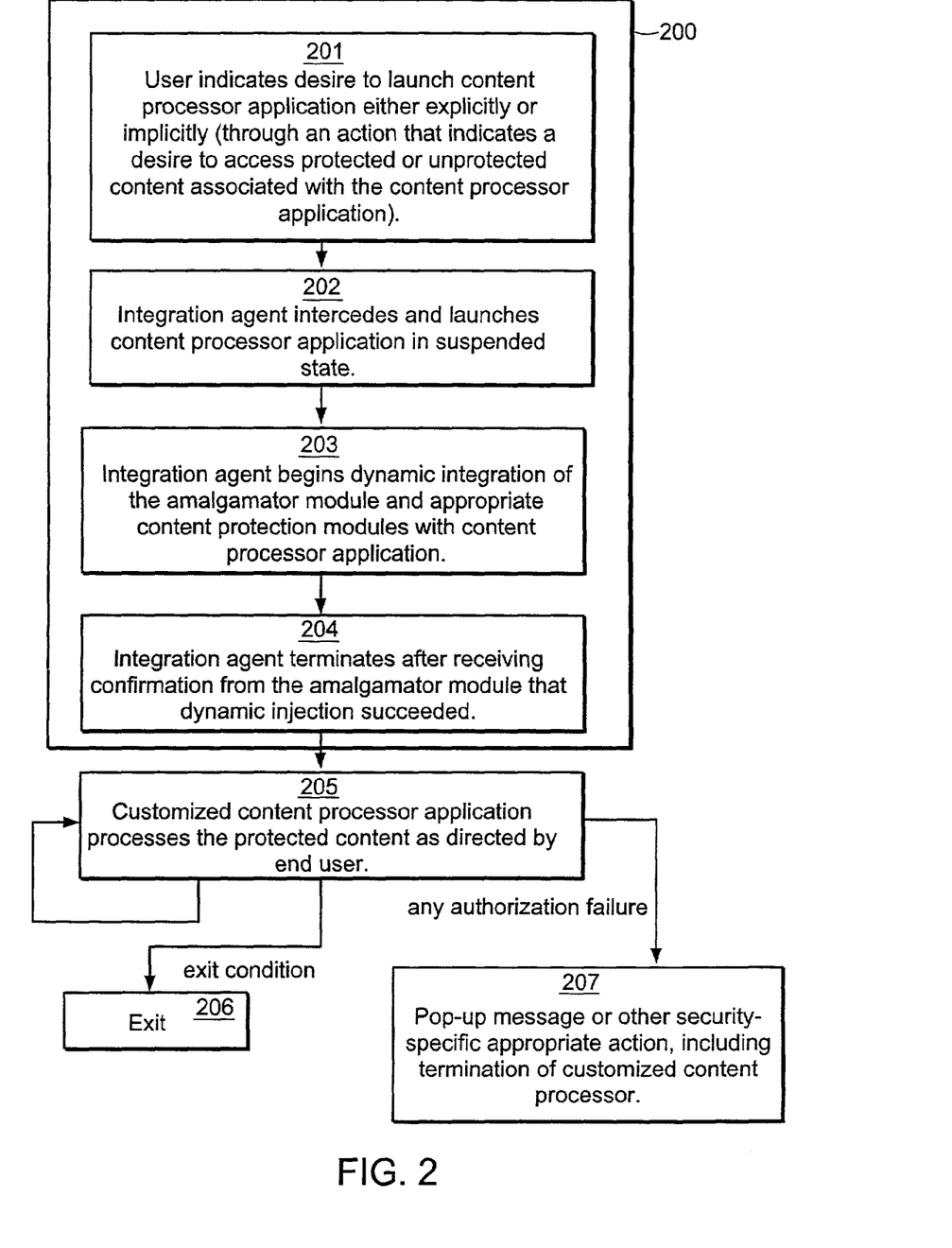
FIG. 2 is a flowchart of the dynamic integration process as implemented by the integration agent of the present invention.

FIG. 2 is a flowchart illustrating the dynamic integration process as implemented by the integration agent 200, once installed, of an embodiment of the present invention.

The process begins, at step 201, when the user indicates, by double-clicking or through other means, a desire to launch a content processor application 121 either explicitly, for example, by clicking on the application itself, or implicitly, for example, by clicking on the content to which access is desired.

At step 202, the integration agent 200 intercedes and launches the content processor application 121 in a suspended state. Launching the content processor application 121 in this manner ensures that no part of the application's execution occurs outside the control of the integration agent 200 or the content protection module 103.

Figure 3A:
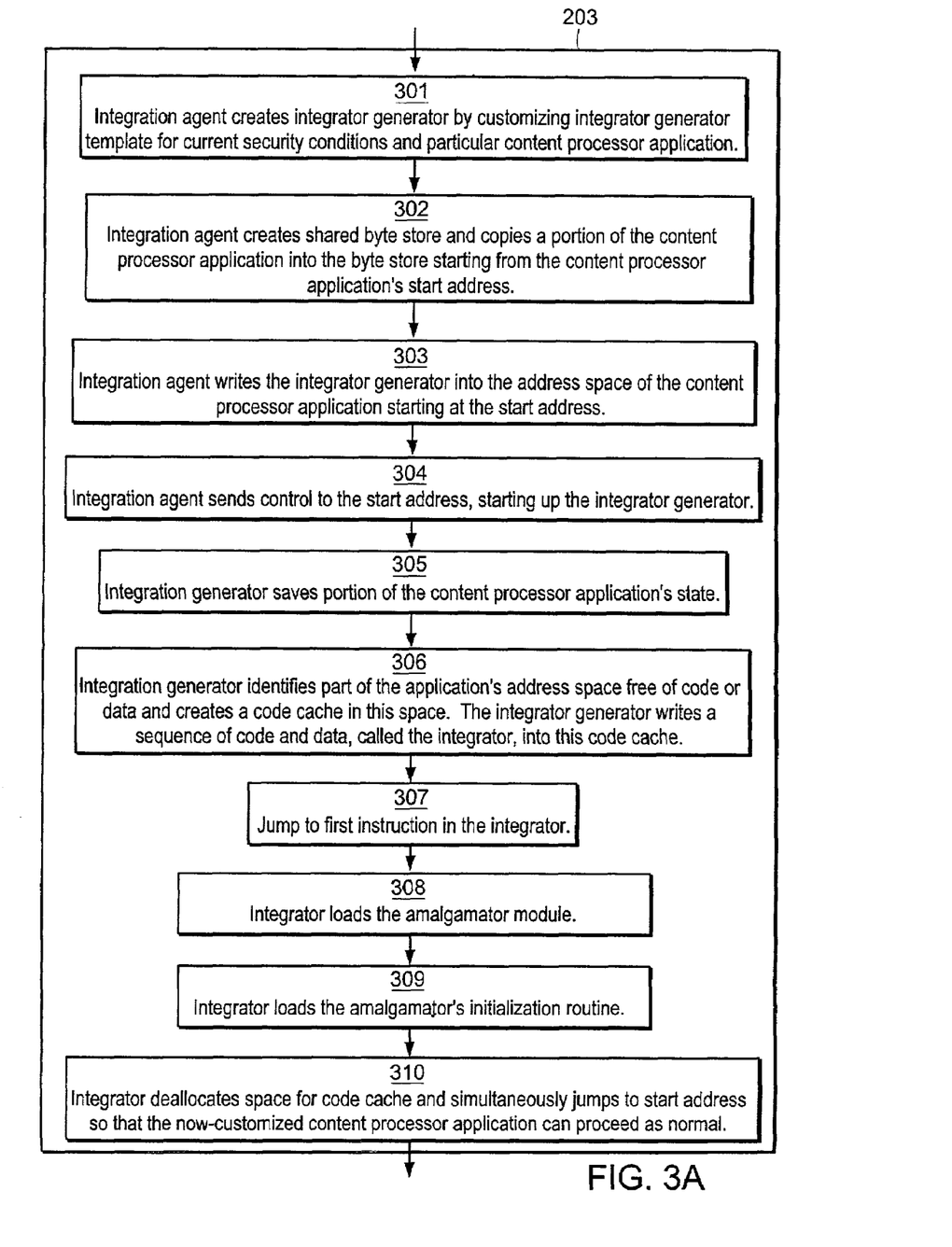
FIG. 3A is a flowchart illustrating details of step 203 of FIG. 2.

At step 203, the integration agent 200 begins the dynamic integration of the amalgamator module and content protection modules 103 with the content processor application 121. As part of this step, the required content protection modules 103 are loaded and the memory image of the content processor application 121 is modified so that the content protection modules 103 are tightly integrated into the application, producing the customized content processor 121A. FIG. 3A, discussed below, provides further details of step 203.

After receiving confirmation from the amalgamator that the dynamic integration (or injection) has succeeded, the integration agent 200 terminates (step 204).

At step 205, execution of the customized content processor application 121A, with its modified capabilities, is resumed. The customized content processor application 121A processes the protected content as direct by the user. Step 205 continues to process until some exit condition is indicated, as at step 206.

On the other hand, if at any time, any authorization failure is detected, then at step 207, some security-specific appropriate action may be triggered. For example, a pop-up message may appear, and/or the execution of the customized content processor application 121A may terminate.

The system is flexible in that any number of content protection modules 103 can be registered for the same type of document. Thus, for example, different content publishers can, if they prefer, register different content protection modules at different times or even at the same time, for a single document type. Even a single content publisher could similarly register different content protection modules 103 for a single document type.

In addition, multiple content protection modules 103 may be integrated into a single content processor application 121, so that the resulting customized content processor application 121A can handle many different protection schemes. Depending on the protected content file being accessed, the appropriate content protection module 103 may automatically be invoked.

The same content publisher may associate different content protection modules 103 with different protected content files, even if all of the files will be processed by the same customized content processor application 121A.

Furthermore, different protected content files requiring different content protection modules 103 may be processed simultaneously by a customized content processor application 121A that is capable of processing several content files simultaneously. For example, a user may use a content processor application, such as Microsoft Word, to open multiple windows simultaneously, each window containing a protected document 107. In an embodiment of the present invention, the customized content processor application 121A may invoke the appropriate content protection module 103 for each protected Word document 107.

Furthermore, the customized content processor 121A can simultaneously process protected content as well as cleartext (i.e., unprotected) content.

Because content protection modules 103 execute within the address space of the customized content processor application 121A, editing of protected content may be supported. For example, the content protection module 103 may include support for decrypting the protected content 111 to permit the customized content processor 121A to edit it, as well as encryption support for protecting the content upon a save to disk or any other mechanism by which protected data is extracted from the address space of the customized content processor 121A.

For example, an appropriately authorized user can open a protected document 107 (e.g., using Microsoft Word), edit that document, and then cut text out of that document or save that document to another file system under a new filename. The exported data remains protected with the security attributes of the original file (i.e., the security status of the exported portions of the protected content 111 do not change). Furthermore, this entire protection process can occur without the knowledge of the appropriately authorized user.

Thus, the invention enables a content publisher to use a custom content encryption or digital rights management format for shipping documents, and have its corresponding custom security solution or authenticator be automatically integrated with whatever content processing application 121 exists on the end user's machine to produce a customized content processor 121A. Furthermore, because the integration is done dynamically without altering the disk image of the content processing application 121, any upgrading or replacement of the content processor application 121 does not affect the ability of the authorized end user to process the protected document. Finally, because the processing of protected content 111 is integrated into applications only when needed at run time, any upgrade or change to algorithms used in the content protection modules 103 can be deployed without the need to redeploy the content processor applications 121.

Next described is an embodiment of the invention in the context of the Windows operating system (specifically a Win32 system such as Windows 2000 and Windows XP) and a Win32 executable application (e.g., Microsoft Word). Although this description focuses on specific applications, executable formats and operating systems, those of ordinary skill in the art will understand that the scope of the invention is not intended to be limited in any way by this particular example.

A Win32 application typically consists of an executable (EXE) file and several, separately compiled, dynamically linked library (DLL) files. These files contain the binary code for the functions that compose the application. Some of the DLLs may be part of the Win32 operating system library, and not part of the application itself.

Launching and running an application involves some existing process on the computing system requesting that a new process be created and loaded with the memory image of the EXE file. Under Windows, "Explorer.exe" (or Explorer, for short) is this existing process; it provides the desktop user interface (UI) familiar to users of Windows. In addition, the "CreateProcess" function in Win32 is the interface point that invokes the Win32 loader for launching a Win32 application.

Functions defined external to but referenced within an EXE or a given DLL file are listed in a special area of the file called the "import table". The import table contains a unique entry for each external function, and is initialized by an operating system utility called the "loader" to contain the actual target address in memory for that function. At runtime, the Win32 loader first loads the EXE file into memory, then examines the EXE file's import table for DLL files that it could reference during the course of execution. Finally, the loader loads each of the DLL files in turn.

Each time a new DLL is loaded, the loader repeats this sequence to load other DLL files that this one may require during the course of execution. The process completes when all DLL dependencies have been resolved, that is, all referenced DLLs have been loaded into memory and initialized. The loader then causes control to jump to the entry point of the application in the EXE memory image, upon which the application begins executing.

In other executable formats, a similar table-like structure may provide the information necessary to allow the system loader to initialize the executables (EXEs in Win32) and shared libraries (DLLs in Win32) so that control can flow between these separately-compiled modules.

It is also possible for an application to specify that a DLL should be loaded and initialized by the Win32 loader. The "LoadLibrary" function in Win32 provides such a capability. Some systems also provide for the delayed loading of DLLs, where the actual loading of a DLL does not occur until the code attempts to transfer control to a function contained within that DLL.

In an embodiment of the present invention, the process described above is modified with respect to launching and running of an EXE, in a manner that involves no additional efforts by the user wishing to run the EXE or by the vendors that provided the EXE and associated DLL files. Next is explained how the dynamic integration process of an embodiment of the present invention modifies the process of launching and running an EXE to achieve the desired goal of such automatic and user-transparent content protection using given content processor applications.

The first step is to achieve the launching of the content processor application 121 for processing the protected content file 107 under control of the integration agent 200. There are a number of different ways to accomplish this, two of which are now discussed.

As a first example, the integration agent 200 may be registered as the application associated with the file type corresponding to protected content documents 107. For example, assume that a protected document will always have the file extension ".CTL". Then by registering the integration agent 200 (at integration agent installation time) as the application associated with the ".CTL" file type, an attempt to open a ".CTL" file will automatically cause the integration agent 200 to be invoked by the operating system. The ".CTL" file selected by the user will then be passed to the integration agent application as an input parameter by the operating system.

Figure 5:
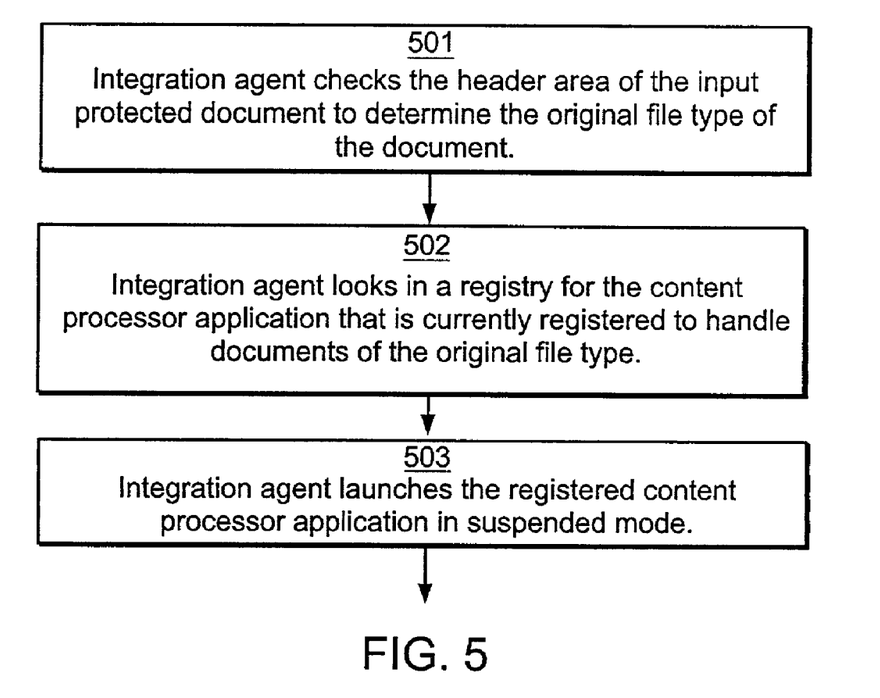
FIG. 5 is a flowchart illustrating the steps performed by the integration agent when it begins execution under one embodiment of the present invention.

FIG. 5 is a flowchart illustrating, for this example, the steps performed by the integration agent 200 of an embodiment of the present invention when it begins execution. Steps 501-503 expand on step 202 of FIG. 2.

First (step 501), the integration agent 200 checks the header area 109 (FIG. 1A) of the input protected document 107 to determine the original file type of the document (e.g., ".DOC" for a Word document). The "header area" is defined as part of the protected content file format, and contains, among other things, information about the original content file (such as its size, file type, etc), and authentication information that will be read by the content protection module 103. The actual format of the header area is dependent on the implementation of the content protection module 103, which is outside the scope of this invention.

Next, at step 502, the integration agent 200 looks in the Windows registry for the content processor application 121 that is currently registered to handle documents of the original file type. For example, this may be some version of Microsoft Word.

Next, at step 503, the integration agent 200 launches the registered content processor application 121 in suspended mode. This is possible in Win32 via the "CreateProcess" system call, which invokes the Win32 loader to load the .EXE executable file and all of its dependent DLLs into memory. By launching the application 121 in suspended mode, the integration agent 200 regains control after the application 121 is loaded into memory, but before it starts execution.

As another example of launching, the dynamic integration method may modify the behavior of, say, the Windows Explorer process. The purpose of the modification is to customize Windows Explorer using the dynamic integration method so that it acts as the integration agent when launching content processor applications 121. Here, the integration process modifies the Explorer so that this process's control flow is directed into a content protection module 103 before execution of the "CreateProcess" call that is used to launch any application in response to a user's interaction with the Windows desktop UI. The code in the protection module 103 may launch the content processor application 121 (Microsoft Word) in suspended mode via its own invocation of the "CreateProcess" system call. As above, the integration agent 200 (this time as a module within Windows Explorer and not as a standalone application) gains control after loading but before the content processor application 121 starts its execution.

An astute reader will realize that the problem of gaining control of the content processor application 121 has simply been changed into a problem of gaining control of the launching of the Windows Explorer process. Again, several options present themselves, two of which are now presented.

One solution is to modify the operating system boot process so that the launching of Windows Explorer is replaced with the launching of the integration agent application whose sole task is to launch and dynamically inject Windows Explorer.

Alternatively, a system may be implemented in which the end user explicitly enables the automatic and dynamic integration of content protection modules 103 into all subsequently launched content processor applications 121. Such a single explicit action may be acceptable and desirable in some end-user situations, and it still provides for the automatic integration of the protection modules 103 with the actual processor applications 121. To achieve such an approach, the Windows Hooks facility supported by the "SetWindowsHookEx" functionality in Win32 may be used to cause Windows to inject the integration agent 200 as a DLL into the address space of the running process that is the Windows Explorer. The procedure specified by the second parameter to the "SetWindowsHookEx" function identifies a procedure within the integration agent DLL, and this procedure implements the work done by the integration agent 200 after it has gained control of the content processor application 121, as described below.

Once the integration agent 200 has control of the content processor application 121, the next step is to inject the amalgamator module 72 (FIG. 3B) into the address space of the content processor and direct the content processor application's control flow into this module. Once the amalgamator module has control, the required content protection modules 103 can be loaded, and the memory image of the content processor application 121 can be modified so that the content protection modules 103 are tightly integrated into the application.

A sequence of steps is followed that yields a solution that is broadly applicable across the entire range of programmable computing systems. Broad applicability is achieved by relying on only a small set of capabilities that can be found on almost any programmable computing system. In particular, the approach followed by an embodiment of the present invention requires the capability and permission for one process to read and write its own or another process's address space.

FIG. 3A is a flowchart illustrating details of step 203 of FIG. 2. These details include the steps by which the integration agent 200 carefully works the amalgamator module 72 into the code space of the content processor, even though the content processor 121 was never designed to load the amalgamator 72 or content protection modules 103.

FIG. 3A describes the interaction between the running process (i.e., the integration agent 200) and the suspended process (i.e., the content processor application 121). The integration agent 200 knows the memory address at which execution of the content processor application has been suspended and where to find the amalgamator 72 and content protection modules 103.

Figure 3B:
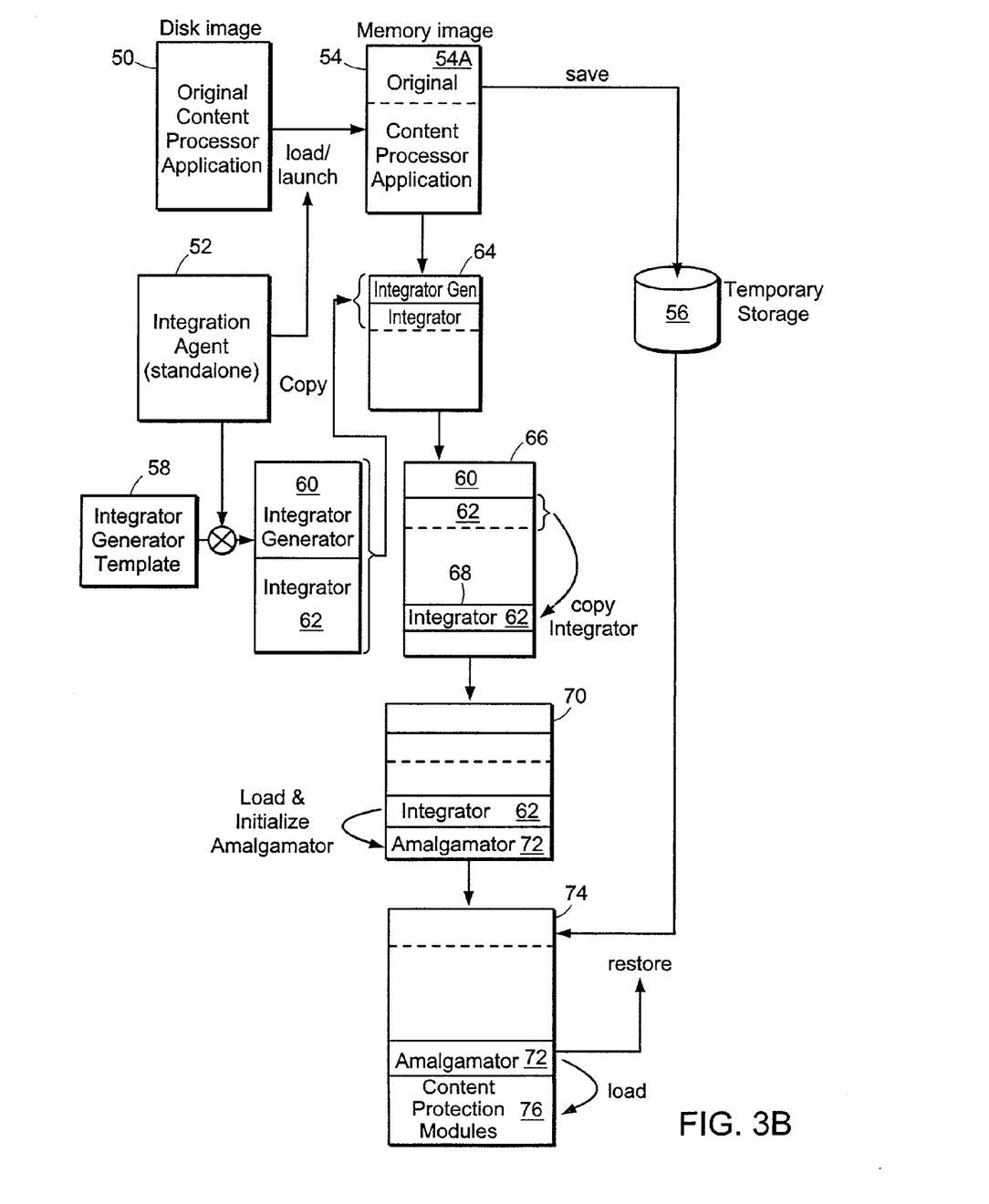
FIG. 3B is a schematic diagram illustrating the process of FIG. 3A.

FIG. 3B is a schematic diagram of the process of FIG. 3A and is discussed in parallel below.

With reference to the top of FIG. 3B, when a user attempts to launch an application (i.e., a content processor application 121), for example by attempting to open the application itself or a document (content) associated with the application, the integration agent 52 is instead launched. The integration agent 52 then causes the original content processor application 121 to be loaded from a master image such as a disk image 50 to a memory image 54. (This corresponds to steps 201 and 202 of FIG. 2.)

In step 301 (FIG. 3A), the integration agent 52 specializes a small code template 58, (the "integrator generator template"). The particular actions taken during this specialization involve setting of instruction immediates and address offsets that depend upon certain memory image 54 values such as the instruction address in the content processor's address space where the processor application is to resume execution (called the start address), the address of the "LoadLibrary" function, and the location of the amalgamator module 72. The result of this specialization is a sequence of code and data bytes called the "integrator generator" 60, which includes an "integrator" 62.

Next, in step 302 of FIG. 3A, the integration agent creates a "shared byte" store 56 that acts both as a communication structure between the integration agent 52 and the amalgamator module 72, and as a temporary store for information. The integration agent 52 copies a portion 54A of the content processor application 54 code into the store 56, starting at the content processor application's start address and continuing until a number of bytes equal to the size of the integrator generator 60/62 have been copied. This copy operation can be accomplished, for example, using the Win32 "ReadProcessMemory" function. The store 56 may also be written with some meta-data that specifies the size of the copied code and its original starting address, among other things. The shared byte store 56 may be created, for example, as a named, memory-mapped file.

Next, in step 303, the integration agent 52 writes the integrator generator 60/62 into the address space of the content processor application starting at the start address, for example using the Win32 "WriteProcessMemory" function, so that the memory image is now as appears at 64. On some systems (including non-Win32 systems), this and possibly other steps may require temporary manipulation of the virtual memory page protection bits to enable reading and writing of the pages containing the referenced code.

In step 304, the integration agent 52 "resumes" execution of the content processor application 64 at the start address, for example using the Win32 "ResumeThread" function. Since first instructions of the integrator generator 60 now reside at that start address, control in the content processor flows to the integrator generator 60. Note that the integrator generator 60 transfers control to the integrator 62 in such a manner that the control flow never has to return to the integrator generator. This is done so that the amalgamator module 72 can restore the application's code originally stored at the start address, thus removing the code for the integrator generator.

Next, in step 305, the integrator generator 60 first saves a portion of the content processor application's state so that resources such as registers can be temporarily used without losing the state of the application. Since the state of the program stack is known, space on the stack can be allocated to save the application's state. Alternatively, other temporary storage (e.g., the shared byte store) could be used.

Next, in step 306, the integrator generator 60 identifies a part of the application's address space free of code or data and creates a code cache 68 in this space. The integrator generator 60 writes a sequence of code and data, called the "integrator" 62, into this code cache. From this cache, calls can safely be made to load and initialize the amalgamator module 72. The image of working memory is now as appears at 66 in FIG. 3B.

Note that the cache 68 is deallocated when the application resumes execution. Such a code cache may be built, for example, by using the next set of free space on the program stack.

Next, in step 307 (FIG. 3A), once the integrator generator 60 has created the integrator 62, it unconditionally jumps to the first instruction in the integrator 62.

The application's code may now be restored as originally found at the start address. In step 308, the integrator 62 loads the amalgamator module 72, so that the memory image is now as appears at 70 in FIG. 3B. Under Win32, this can be done with a call to "LoadLibrary", with the module name recorded during specialization of the integrator generator template 58.

In step 309 (FIG. 3A), once the amalgamator module 72 has been loaded, control returns to the integrator 62, which then makes a call to an initialization routine in the amalgamator module 72. The details of this initialization routine 309 are explained below, with respect to FIG. 4. Under Win32, a loaded module is given the opportunity to initialize itself by placing some code in the stylized "DllMain" function required in all Win32 DLLs. Applicants have found that it is better to have the integrator 62 make a call to a separate initialization routine run after the completion of the "LoadLibrary" call, since only a small set of the application's and operating system's functionality is available within "DllMain".

Finally, in step 310, once the amalgamator's 72 initialization routine has completed, control again returns to the integrator 62. Part of the amalgamator's initialization process 309 involves restoring of the content processor application's code originally found at the start address, from the store 56. The integrator 62 can now deallocate the space for the code cache 68 and unconditionally jump to the start address, thus returning control to the now customized content processor.

Again, there are many methods that can accomplish this. Some architectures like the Intel x86 provide a return instruction that simultaneously deallocates a block of space on the program stack. If no architectural mechanism exists for atomically deallocating space and non-trivially changing the program counter, an alternative would be to leave a small amount of code cache space in the content processor application, enough to deallocate the larger code cache and return control to the start address.

The initialization routine 309 (FIG. 4) in the amalgamator module 72 is primarily responsible for loading the content protection modules 76 and tightly integrating them into the memory image of the content processor application to produce the customized content processor, so that the memory image finally appears as at 74 in FIG. 3B. The amalgamator 72 and content protection modules 76 are collectively called the "protection agent".

This integration process, however, does not stop once the content processor application begins running. Other events, such as the delay loading of a DLL or the explicit loading of a DLL by code in the content processor, may require that some portion of the integration process run again to ensure that the content protection modules are properly integrated with the current state of the content processor. Similarly, the launching of another content processor application by this content processor requires the amalgamator 72 to act as an integration agent and propagate itself as described above to this new content processor.

Figure 4:
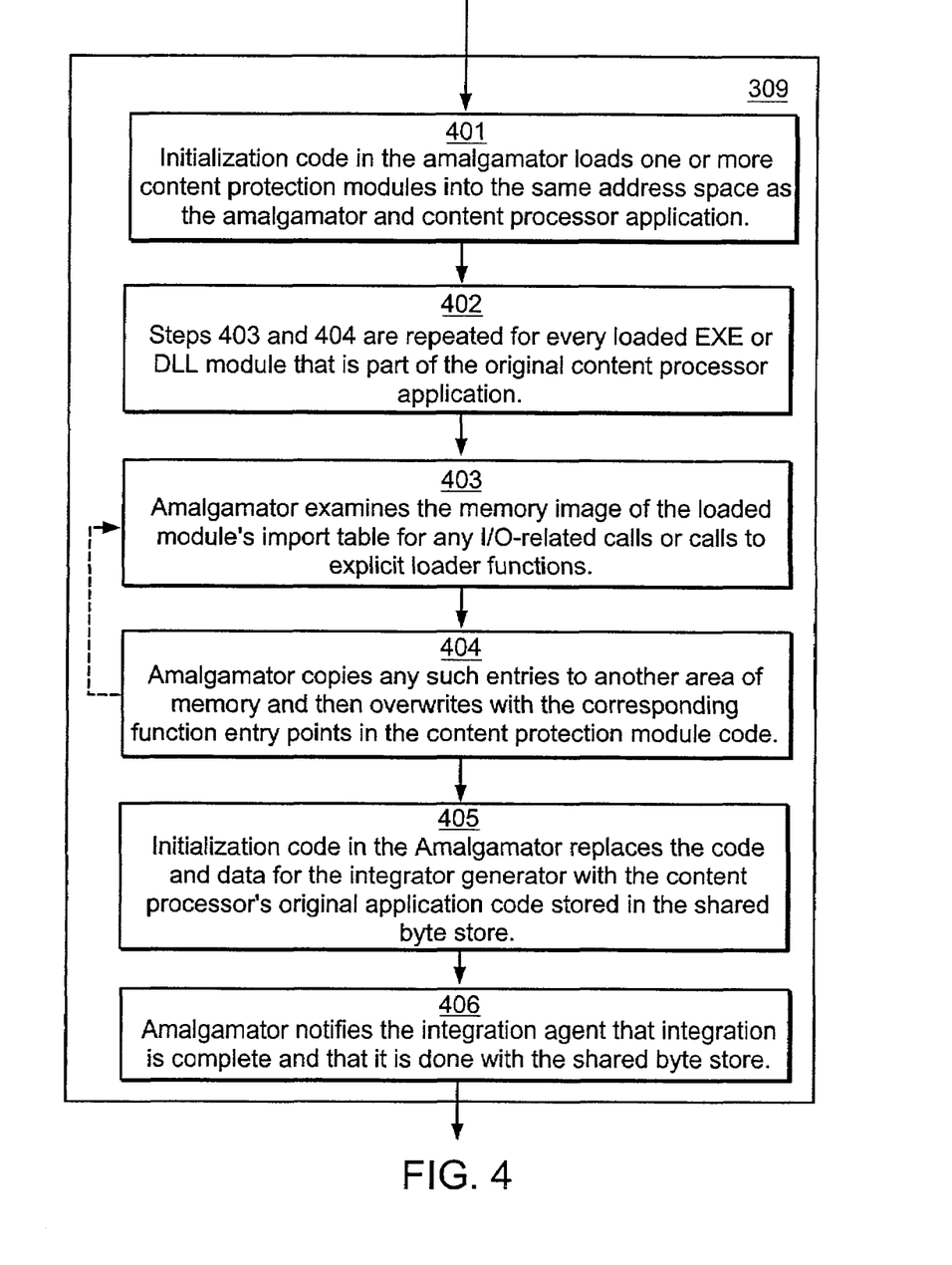
FIG. 4 is a flowchart illustrating the amalgamator initialization routine of step 309 of FIG. 3A.

In general, the integration process as performed by the amalgamator module 72 begins in its initialization routine 309 and proceeds as shown in the flowchart in FIG. 4. Recall that this integration process begins as part of step 309 of FIG. 3A, once the content processor application 121 (that is, its EXE and dependent DLL files) and amalgamator module 72 (but not the content protection modules) have been loaded.

Referring to FIG. 4, at step 401, the amalgamator 72 determines the type and location of the content protection modules to load and loads them. The first part of this step may be accomplished, for example, by having the amalgamator 72 read part of the header area of a protected content file 107 to determine the associated content protection module 103 for the file. Alternatively, the integration agent 52 may have specified the location of the content protection modules to load by encoding that information in the shared byte store 56.

A content protection module can be shipped separately by the content publisher, or some or all of it can optionally be embedded into the protected content file itself. In all cases, the entire contents of each protection module are copied into the address space of the content processor application.

At step 402, the amalgamator 72 identifies each module (EXE or DLL) that is part of the content processor application's loaded memory image. Using this list, the amalgamator performs steps 403 and 404.

At step 403, the amalgamator 72 examines the module to identify any file I/O-related operating system calls that can be made by the content processor application while executing this module. I/O functions, or system calls, are those involved in input and output to the file system, including operations such as read and write, as well as cut and paste operations. Such an analysis may be performed, for example, by the amalgamator 72 examining the import table of the module looking for addresses of known file I/O-related functions.

At step 404, the identified calls are rewritten by the amalgamator 72 so that control flows not to the I/O related function on such calls but to a corresponding function defined in a content protection module. Again, there are many ways to accomplish this redirecting of control flow.

One such method that is appropriate for the example given above involves the replacement of the I/O-related function call entries in the module's import table with the addresses of corresponding functions defined in the content protection module. The original address inserted by the Win32 loader into that import table entry is also noted in a separate table that is accessible by the content protection module code. This "patching" of the import table ensures that when the application makes the I/O call, the content protection module gets control first, allowing it to perform any authentication or decryption actions before redirecting the call to the original function address.

Other methods exist for achieving this redirection of control that could be used in alternative embodiments of the present invention. An early article by Peter Kessler (Peter B. Kessler, "Fast breakpoints: Design and implementation," Proceedings of the ACM SIGPLAN'90 Conference on Programming Language Design and Implementation (PLDI), pages 78-84, White Plains, N.Y., 20-22 Jun. 1990. SIGPLAN Notices 25(6), June 1990) describes the basic mechanisms and issues involved in patching code for the purpose of control flow redirection. A more recent article by Galen Hunt and Doug Brubacher (Galen Hunt and Doug Brubacher, "Detours: Binary Interception of Win32 Functions", Proceedings of the 1999 Usenix Windows NT Symposium, USENIX Association, 1999) describes such a system explicitly for the binary interception of Win32 functions.

Any function calls used to explicitly load another DLL or executable into memory (such as the "LoadLibrary" call in the Windows operating system) are also handled by steps 402 and 403 as described above. For example, a call to "LoadLibrary" by customized content processor application during its execution will cause the amalgamator 72 to execute steps 403 and 404 for each newly loaded DLL. This ensures that any DLL or executable that is explicitly loaded by the content processor application at execution time will also have its import table entries patched appropriately.

It is important to note that a facility is provided by the amalgamator 72 for the routines in the amalgamator and content protection modules to access the functions protected in steps 403 and 404 above. For example, the "patching" mentioned above occurs only on import tables of modules belonging to the original application and not to modules associated with the amalgamator or the content protection modules.

Finally, in step 405, the initialization routine 309 of the amalgamator accesses the shared byte store 56, replaces the code and data for integrator generator with the content processor's original application code, and then in step 406 signals to the integration agent 63 that it is done with the shared byte store 56. As described in step 309 of FIG. 3A, the initialization routine 309 of the amalgamator returns so that the suspended application can resume execution. When the integration agent 52 receives notification from the amalgamator 72 that injection is complete, it terminates (or returns control to the Windows Explorer for the example scenario).

What is left is a single content processor application process 74 (FIG. 3B), which to the end user appears no different from the original content processor application had it been launched normally. In actual fact, the executing content processor application has one or more tightly integrated content protection modules embedded in it.

To the end user, this entire process is transparent. It appears as though double-clicking on (or otherwise selecting) a protected content ".DOC" file directly invoked the content processor application. Assuming no authentication check fails in the protection module, the protected content looks no different to the content processor application than the equivalent clear-text ".DOC" Word file—all viewing and editing operations work normally.

A content protection module 103 can prevent the export of any part of the protected document by simply ensuring that any I/O operations that target an unprotected file or memory buffer only write out encrypted data. That is, "cut/paste" operations can be prevented from being used to copy the contents of the protected document to an unprotected document. Thus, the protection associated with the document (content) continues to persist, independent of the content processor application used to process it.

The invention provides a very practical way to deploy digital content protection solutions in the market. Consider a secure enterprise email solution as an example to illustrate this point. Many current secure email solutions allow an email sender to encrypt an outgoing email, and require the recipient to connect to a trusted server to download an authorization key that will allow the recipient user to decrypt the message. The message itself is never decrypted to disk, so the clear text form of the original message never persists on the recipient's machine.

However, the problem with existing solutions arises in the case of attachments that are sent with the encrypted message. Attachments can also be encrypted using the same key, but unless the application used to read the attachment on the recipient's machine understands the content encryption format, the attachment cannot be read directly.

Thus, if the attachment is a Word document that was encrypted on send, the attachment has to be first decrypted back to the original Word document on the recipient's machine before the Microsoft Word application on the recipient's machine can read it. Unfortunately this creates a security hole, since the original Word document now persists in clear-text form on the recipient's machine, allowing the recipient to copy it illegally, or distribute it to unauthorized persons in an unprotected (unencrypted) form.

With an embodiment of the present invention, when the recipient opens the encrypted attachment, the integration agent is invoked transparently (to the recipient), launching the Microsoft Word application and dynamically integrating the appropriate content protection module with the application in memory. Finally, the modified application may read the protected Word attachment directly.

Because the content protection module intercepts all I/O traffic between the Microsoft Word application and the content file, the fact that the attachment is an encrypted Word document is also transparent to the Word application. The end user never experiences the integration agent or the integration process, and is unaware that the attachment is actually an encrypted document, unless he or she attempts to make an unauthorized access.

When the content protection module discovers an unauthorized access, it can display a message indicating authorization failure, and terminate the Microsoft Word application. The content protection module could also be used to automatically maintain an audit trail.

Those of ordinary skill in the art should recognize that methods involved in protecting digital content from unauthorized use by automatically and dynamically integrating a content-protection agent may be embodied in a computer program product that includes a computer usable medium. For example, such a computer usable medium can include a readable memory device, such as a solid state memory device, a hard drive device, a CD-ROM (compact disk read only memory), a DVD-ROM (digital video data read only memory), or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention encompassed by the appended claims. For example, the methods of the invention can be applied to various environments, and are not limited to the described environment.

What is claimed is:

1. A method for extending a content processor application, comprising:
   loading a content processor application into memory from a master image to form a runtime content processor application image;
   suspending execution of the runtime content processor application image;
   dynamically integrating a protection agent into the runtime content processor application image to form a customized content processor application with extended functionality by (i) identifying file input/output related operating system calls of the runtime content processor application image that can be made by the application, and (ii) overwriting the identified file input/output related operating system calls of the runtime content processor application image to point to corresponding functions which extend functionality, only the runtime content processor application image being altered and extended with the protection agent, the master image being unaltered; and
   resuming execution of the customized runtime content processor application image.

2. The method of claim 1, wherein the protection agent comprises at least one content protection module.

3. The method of claim 2, wherein the protection agent further comprises an amalgamator, the step of integrating the protection agent into the runtime content processor application image comprising:
   injecting the amalgamator into the runtime content processor application image; and
   loading, by the amalgamator, the at least one module, and integrating the module with the runtime content processor application image to provide the extended functionality.

4. The method of claim 2, wherein at least one content protection module is used to access protected content.

5. The method of claim 4, wherein at least one content protection module prevents the export, in an unprotected form, of at least a portion of the protected content.

6. The method of claim 5, wherein the at least one content protection module prevents the export of protected content by causing all input/output operations that target unprotected files/memory buffers to write out data in a protected format.

7. The method of claim 2, wherein the at least one content protection module is produced by a third-party.

8. The method of claim 2, wherein plural content protection modules are simultaneously registered with the protection agent.

9. The method of claim 8, wherein the plural content protection modules are used in parallel by the customized content processor application to process different documents.

10. The method of claim 8, wherein the plural content protection modules are used in parallel by the customized content processor application to process different portions of a single document.

11. The method of claim 2, wherein the plural content protection modules correspond to different content formats.

12. The method of claim 1, the protection agent executes within the same address space as the customized content processor application.

13. The method of claim 12, wherein the protection agent supports editing of protected content without the loss of protection.

14. The method of claim 12, wherein the protection agent intercepts any of: input/output function calls, memory storage calls, and cut/paste calls.

15. The method of claim 1, wherein the protection agent is used by the customized content processor application to process different documents in parallel.

16. The method of claim 1, wherein the protection agent is used by the customized content processor application to process differently protected portions of a single document in parallel.

17. The method of claim 1, wherein the protection agent prevents the export, in an unprotected form, of at least a portion of the protected content.

18. The method of claim 17, wherein the protection agent prevents the export of protected content by causing all input/output operations that target unprotected files/memory buffers to write out data in a protected format.

19. The method of claim 1, wherein the protection agent maintains an audit trail.

20. The method of claim 1, wherein the customized content processor processes both protected and unprotected content.

21. The method of claim 1, wherein the extended functionality comprises any of content protection, rights management, and encryption/decryption.

22. The method of claim 1, wherein the protection agent is independent of the content processor application.

23. The method of claim 1, wherein the protection agent is independent of any plugin interface provided by the content processor application.

24. The method of claim 1, wherein the content processor application is an existing/legacy application.

25. The method of claim 1, wherein the content processor application is a new version of an existing application.

26. The method of claim 1, further comprising:
modifying an operating system boot process so that upon attempting to launch of a particular application, said particular application used to launch other applications, instead an integration agent application is launched, the integration agent launching the particular application and dynamically integrating the particular application with the protection agent.

27. The method of claim 1, further comprising:
explicitly enabling, by a user, automatic and dynamic integration of the protection agent into all subsequently launched content processor applications.

28. The method of claim 1, wherein the step of dynamically integrating a protection agent into the runtime content processor application image is performed by an integration agent.

29. The method of claim 28, wherein the integration agent is a standalone software application.

30. The method of claim 28, wherein the integration agent is associated with a file type corresponding to at least one protected content document.

31. The method of claim 1, file input/output related operating system calls being identified by examining an import table associated with the runtime content processor application image, and the system calls being overwritten by overwriting corresponding identified entries in the import table.

32. The method of claim 1, further comprising:
identifying function calls to load additional executable code into memory; and
overwriting the identified function calls to point to corresponding functions contained within the protection agent.

33. The method of claim 32, wherein additional executable code comprises a dynamically linked library module.

34. The method of claim 1, wherein the steps of loading the application and integrating the protection agent into the runtime content processor application image are performed automatically when the application is selected for execution.

35. The method of claim 1, wherein the steps of loading the application and integrating the protection agent into the runtime content processor application image are performed transparently.

36. The method of claim 1, further comprising:
registering an integration agent in place of the application, the integration agent being executed when the application is selected, the integration agent integrating the protection agent into the runtime content processor application image.

37. A computer system for extending a content processor application, comprising:
a loader utility that loads a content processor application into memory from a master image to form a runtime content processor application image;
an integration agent that suspends execution of the runtime content processor application image, dynamically integrates a protection agent into the runtime content processor application image to form a customized content processor application with extended functionality by (i) identifying file input/output related operating system calls of the runtime content processor application image that can be made by the application, and (ii) overwriting the identified file input/output related operating system calls of the runtime content processor application image to point to corresponding functions which extend functionality, only the runtime content processor application image being altered and extended with the protection agent, the master image being unaltered, resumes execution of the customized runtime content processor application image; and
the protection agent.

38. The system of claim 37, wherein the protection agent comprises:
at least one content protection module.

39. The system of claim 38, wherein the protection agent further comprises an amalgamator, the integration agent injecting the amalgamator into the runtime content processor application image, and the amalgamator loading the at least one module, and integrating the module with the runtime content processor application image to provide the extended functionality.

40. The system of claim 38, at least one content protection module being used to access protected content.

41. The system of claim 40, wherein at least one content protection module prevents the export, in an unprotected form, of at least a portion of the protected content.

42. The system of claim 41, wherein the at least one content protection module prevents the export of protected content by causing all input/output operations that target unprotected files/memory buffers to write out data in a protected format.

43. The system of claim 38, the at least one content protection module being produced by a third-party.

44. The system of claim 38, plural content protection modules being simultaneously registered with the protection agent.

45. The system of claim 44, wherein the plural content protection modules correspond to different content formats.

46. The system of claim 44, wherein the plural content protection modules are used in parallel by the customized content processor application to process different documents.

47. The system of claim 44, wherein the plural content protection modules are used in parallel by the customized content processor application to process different portions of a single document.

48. The system of claim 37, the protection agent executing within the same address space as the customized content processor application.

49. The system of claim 48, the protection agent supporting editing of protected content without the loss of protection.

50. The system of claim 48, the protection agent intercepting any of: input/output function calls, memory storage calls, and cut/paste calls.

51. The system of claim 37, wherein the protection agent is used by the customized content processor application to process different documents in parallel.

52. The system of claim 37, wherein the protection agent is used by the customized content processor application to process differently protected portions of a single document in parallel.

53. The system of claim 37, wherein the protection agent prevents the export, in an unprotected form, of at least a portion of the protected content.

54. The system of claim 53, wherein the protection agent prevents the export of protected content by causing all input/output operations that target unprotected files/memory buffers to write out data in a protected format.

55. The system of claim 37, wherein the protection agent maintains an audit trail.

56. The system of claim 37, wherein the customized content processor processes both protected and unprotected content.

57. The system of claim 37, wherein the extended functionality comprises any of content protection, rights management, and encryption/decryption.

58. The system of claim 37, wherein the protection agent is independent of the content processor application.

59. The system of claim 37, wherein the protection agent is independent of any plugin interface provided by the content processor application.

60. The system of claim 37, wherein the content processor application is an existing/legacy application.

61. The system of claim 37, wherein the content processor application is a new version of an existing application.

62. The system of claim 37, wherein an operating system is modified so that upon an attempt to launch of a particular application, said particular application used to launch other applications, instead the integration agent is (executed, the integration agent launching the particular application and dynamically integrating the particular application with the protection agent.

63. The system of claim 37, wherein automatic and dynamic integration of the protection agent into all subsequently launched content processor applications is explicitly enabled by a user.

64. The system of claim 37, wherein the integration agent is a standalone software application.

65. The system of claim 37, wherein the integration agent is associated with a file type corresponding to at least one protected content document.

66. The system of claim 37, wherein the protection agent identifies file input/output related operating system calls by examining an import table associated with the runtime content processor application image, and overwriting the system calls by overwriting corresponding identified entries in the import table.

67. The system of claim 37, wherein the protection agent identifies function calls to load additional executable code into memory, and overwrites the identified function calls to point to corresponding functions contained within the protection agent.

68. The system of claim 67, wherein additional executable code comprises a dynamically linked library module.

69. The system of claim 37, wherein the application is loaded and integrated with the protection agent into the runtime content processor application image automatically when the application is selected for execution.

70. The system of claim 37, wherein application is loaded and integrated with the protection agent into the runtime content processor application image transparently.

71. The system of claim 37, wherein the integration agent is registered in place of the application, the integration agent being executed when the application is selected, the integration agent integrating the protection agent into the runtime content processor application image.

72. A computer program product for extending a computer application, the computer program product comprising a computer usable medium having computer readable code thereon, including program code which when executed by a computer causes the computer to:
load a content processor application into memory from a master image to form a runtime memory image of the application;
suspend execution of the runtime content processor application image;
dynamically integrate a protection agent into the runtime memory image of the application to form a customized content processor application by (i) identifying file input/output related operating system calls of the runtime content processor application image that can be made by the application, and (ii) overwriting the identified file input/output related operating system calls of the runtime content processor application image to point to corresponding functions which extend functionality, only the runtime memory image of the application being altered and extended with the protection agent, the master image being unaffected; and
resume execution of the customized runtime content processor application image.

73. A computer program product as claimed in claim 72 wherein the customized content processor application has extended functionality including any of content protection, rights management and encryption/decryption, and the customized content processor application indicates the same.

74. A computer system for extending a content processor application, comprising:
a digital processor having a memory;
means for loading the content processor application into memory from a master image to form a runtime memory image of the application;
means for suspending execution of the runtime content processor application image;
means for dynamically integrating a protection agent into the runtime memory image to form a customized content processor application by (i) identifying file input/output related operating system calls of the runtime content processor application image that can be made by the application, and (ii) overwriting the identified file input/output related operating system calls of the runtime content processor application image to point to corresponding functions which extend functionality, only the runtime memory image of the application being altered and extended with the protection agent, the master image being unaffected; and
means for resuming execution of the customized runtime content processor application image.

75. A computer system as claimed in claim 74 wherein the customized content processor application has extended functionality including any of content protection, rights management and encryption/decryption, and the customized content processor application indicates the same.

* * * * *